US00RE39001E

(19) United States
(12) Reissued Patent
Lundquist et al.

(10) Patent Number: US RE39,001 E
(45) Date of Reissued Patent: Mar. 7, 2006

(54) LASER CUTTING METHOD FOR FORMING MAGNETIC RECORDING HEAD SLIDERS

(75) Inventors: Paul Matthew Lundquist, San Jose, CA (US); Andrew Ching Tam, deceased, late of Saratoga, CA (US); by Eugenia Tam, legal representative, Saratoga, CA (US); Yunlong Sun, Beaverton, OR (US)

(73) Assignees: Electro Scientific Industries, Inc., Portland, OR (US); Hitachi Global Storage Technologies, Netherlands B.V., Amsterdam (NL)

(21) Appl. No.: 10/330,975

(22) Filed: Dec. 26, 2002

Related U.S. Patent Documents

Reissue of:
(64) Patent No.: 6,255,621
Issued: Jul. 3, 2001
Appl. No.: 09/494,789
Filed: Jan. 31, 2000

(51) Int. Cl.
*B23K 26/38* (2006.01)

(52) U.S. Cl. ..... 219/121.72; 219/121.69
(58) Field of Classification Search ..... 219/121.68, 219/121.69, 121.72, 121.8
See application file for complete search history.

(56) References Cited

U.S. PATENT DOCUMENTS

| | | | | |
|---|---|---|---|---|
| 4,169,976 | A | 10/1979 | Cirri | 219/121.85 |
| 4,835,361 | A | 5/1989 | Strom | 219/121.85 |
| 5,198,637 | A | 3/1993 | Noda et al. | 219/121.69 |
| 5,739,048 | A | 4/1998 | Kerth et al. | 437/226 |
| 5,779,753 | A | 7/1998 | Vetter et al. | 65/105 |
| 5,841,099 | A | 11/1998 | Owen et al. | 219/121.69 |
| 5,872,684 | A | 2/1999 | Hadfield et al. | 360/103 |
| 6,049,056 | A | 4/2000 | Balamane et al. | 219/121.69 |
| 6,063,695 | A | 5/2000 | Lin et al. | 438/462 |
| 6,420,245 | B1 | 7/2002 | Manor | 438/460 |
| 2001/0034564 | A1 | 10/2001 | Jones | 700/166 |
| 2002/0033558 | A1 | 3/2002 | Fahey et al. | 264/400 |
| 2002/0149136 | A1 | 10/2002 | Baird et al. | 264/400 |

FOREIGN PATENT DOCUMENTS

| | | |
|---|---|---|
| JP | 58-9782 | 1/1983 |
| JP | 61-186185 | 8/1986 |
| JP | 3-64043 | 3/1991 |
| JP | 4-309480 | 11/1992 |

OTHER PUBLICATIONS

"Method of Preventing Damage to Integrated Circuit Chips During Wafer Dicing," IBM Technical Disclosure Bulletin vol. 34, Issue 12, pp. 311–312 (May 1, 1992).
"Creation of an Air Bearing Surface by Excimer Laser Patterning of Ceramic," IBM Technical Disclosure Bulletin vol. 34, Issue 4B, pp. 59–60 (Sep. 1, 1991).

*Primary Examiner*—Geoffrey S Evans
(74) *Attorney, Agent, or Firm*—Stoel Rives LLP

(57) ABSTRACT

A method for cutting a ceramic wafer to form individual sliders for use in supporting the read/write heads in magnetic recording disk drives uses multiple parallel scans of a pulsed laser to ablate the ceramic material. After the wafer has been cut into individual rows, a pulsed laser beam is directed to that surface of the row that will become the disk sides of the sliders (i.e., the sides of the sliders that will face the disks in the disk drive). The laser is pulsed as the laser spot is moved along a first scan line across the surface of the wafer row to form a generally V-shaped trench. The laser spot is then moved in a direction generally perpendicular to the first scan line a distance less than the laser beam diameter, and then pulsed while the laser spot is scanned along a second line generally parallel to the first scan line. This slight offset of the laser beam during the second scan blends the edges of the wafer surface at the trench to remove protrusions formed at those edges by the first laser scan. The laser is then moved to the other side of the first scan line a distance less than the laser beam diameter and a third scan is made to blend the other edge. One of more subsequent laser scans can be made along the first scan line to either cut deeper or to cut completely through the wafer row to completely separate the sliders.

7 Claims, 5 Drawing Sheets

LASER CUTTING METHOD FOR FORMING MAGNETIC RECORDING HEAD SLIDERS

Matter enclosed in heavy brackets [ ] appears in the original patent but forms no part of this reissue specification; matter printed in italics indicates the additions made by reissue.

TECHNICAL FIELD

This invention relates generally to the manufacture of air-bearing sliders used for supporting the read/write heads in magnetic recording hard disk drives, and more particularly to a method for separating sliders from rows of uncut sliders.

BACKGROUND OF THE INVENTION

In a hard disk drive each magnetic recording data storage disk surface has an associated slider. The slider has a side that faces the disk that includes an air-bearing surface (ABS), and a back or trailing side that supports the patterned read/write head. In operation of the disk drive, the disks are rotated and the sliders are supported with their ABS very close to the disk surfaces. Because of the extremely close proximity of the sliders and their associated disk surfaces, and the high stresses encountered when the sliders are brought into contact or removed from contact with the disk surfaces, it is advantageous that the sliders have blended or rounded edges at their disk sides.

The sliders are built in wafer form, in which a large number of magnetic read/write heads are formed using semiconductor processing techniques on the surface of a ceramic wafer. Typically up to 20,000 heads can be patterned on a 5-inch diameter wafer. The wafer is formed of a ceramic composite material containing TiC and $Al_2O_3$, as well as trace amounts of other materials, such as MgO. After the read/write heads are patterned, the wafer is cut into blocks called "quads", the quads are cut into rows, and the rows are cut into sliders. Each of these cutting processes is typically performed with a diamond-tipped saw. Once the wafer rows have been cut from the wafer, the individual sliders can be partially cut with a saw and then later completely separated by a mechanical snapping or cleaving process. The sawing process, including the partial cutting process of the sliders in the wafer row, is described in detail in IBM's U.S. Pat. No. 5,739,048, which is incorporated herein by reference. In that patent, FIG. 1A shows a wafer with the patterned read/write heads, FIG. 2A shows a wafer row, and FIGS. 8–9 show a wafer row with partially separated sliders.

There are many disadvantages to the sawing process. The manufacturing cost of the sawing process is affected by several physical limitations. The size of the saw blade and therefore the size of the kerf area that is eradicated by the saw determines the spacing density of the sliders on a wafer. If the size of the saw kerf can be reduced, the sliders can be formed closer together and thus more sliders contained on a wafer, thereby reducing the per-slider cost. The sawing process with its associated large mechanical and frictional forces tearing into the slider material also produces a variety of physical damage, such as chipping, scratching, and cracking of the sliders and delamination of the patterned layers of the read/write heads. Because the sawing process includes significant rubbing it can also cause the accumulation of static electrical charge, which can damage the read/write heads when discharged. Finally, the sawing process leaves sharp comers and edges so that a separate edge blending or rounding step must be performed.

What is needed is a method of cutting wafers into quads, quads into rows, and especially rows into sliders that produces a reduced kerf region to allow closer packing of sliders on a wafer, that reduces physical and electrical damage to the sliders and the read/write heads, and that leaves blended or rounded edges on the disk sides of the sliders.

SUMMARY OF THE INVENTION

The invention is a method for cutting a ceramic wafer to form individual sliders for use in supporting the read/write heads in magnetic recording disk drives. After the wafer has been cut into individual rows, a pulsed laser beam is directed to that surface of the row that will become the disk sides of the sliders (i.e., the sides of the sliders that will face the disks in the disk drive). The laser beam scribes or partially cuts a generally V-shaped trench in the row while simultaneously blending the surface edges adjacent the trench. In the preferred process, the laser is pulsed as the laser spot is moved along a first scan line across the surface of the wafer row to form the trench. The laser spot is then moved in a direction generally perpendicular to the first scan line a distance less than the laser beam diameter, and then pulsed while the laser spot is scanned along a second line generally parallel to the first scan line. This slight offset of the laser beam during the second scan blends the edges of the wafer surface at the trench to remove protrusions formed at those edges by the first laser scan. The laser is then moved to the other side of the first scan line a distance less than the laser beam diameter and a third scan is made to blend the other edge. If it is desired to cut deeper into the wafer row the laser beam can be moved back to the first scan line and one or more subsequent laser scans can be formed to either cut deeper, or to cut completely through the wafer row to completely separate the sliders.

The method of the present invention simultaneously partially cuts the sliders from the wafer row and blends the edges at the disk sides of the sliders, thereby eliminating a subsequent separate edge blending step. The laser cutting process allows more sliders to be formed from a single ceramic wafer since substantially less ceramic material is removed than would be removed if the conventional diamond-tipped sawing process were used.

For a fuller understanding of the nature and advantages of the present invention, reference should be made to the following detailed description taken together with the accompanying figures.

DESCRIPTION OF THE PREFERRED EMBODIMENTS

The ceramic wafers from which the sliders are fabricated according to the method of the present invention are commercially available from various sources, such as 3M Corporation and Sumitomo.

The machining of sliders by laser ablation to create recesses in the slider disk side and thereby form the rails of the ABS is known, as described in U.S. Pat. No. 4,835,361. The previously cited IBM '048 patent suggests that partial cuts in the wafer row may be formed by laser ablation, but gives no details of such a process.

Figure 1:
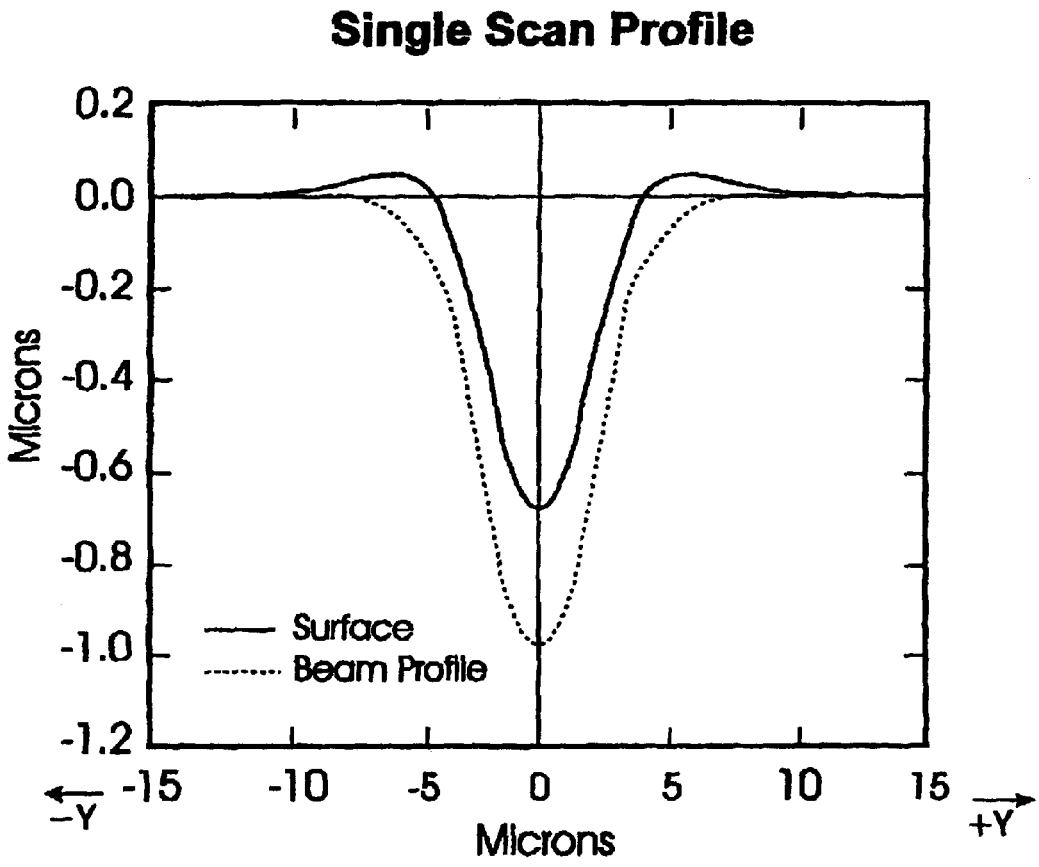
FIG. 1 depicts the Gaussian profile (dashed line) of the intensity of a laser spot from a single laser pulse and the theoretical cross-section of the resulting wafer surface profile (solid line) after the pulsed laser spot has been scanned along a line.

The cutting of material by laser ablation has been used for a number of applications that are not sensitive to edge quality or cleanliness, so the mere suggestion that it can be used for scoring sliders in a ceramic wafer row does not teach that a practical process can be developed. It is known that standard laser processing produces an edge quality that is not as desirable as that resulting from diamond saw slicing, particularly in regard to material protruding above the original surface after laser slicing. This is because manufacturing ease requires that laser ablation be performed with the laser beam at normal incidence to the substrate if a large number of parts are to be processed in batch form. At normal incidence a laser pulse causes a hole to be formed, but a crater is produced at the border or rim of the laser pulse profile. This crater results from melting and reflowing of the substrate material and from redeposition of ablated material. This problem is fundamental to the application of laser ablation because a transition region exists between the high intensity region above the ablation threshold and the region untouched by the laser. This transition region is called the "heat affected zone" or HAZ. Regardless of the shape of the laser pulse, a HAZ of some extent will always be present, and the result is some degree of cratering causing protrusion above the original surface. For $TiC/Al_2O_3$ ceramic materials this protrusion is typically several microns or more. In modern disk drives, the separation between the slider and the disk surface is around 15 nanometers or less, so any protrusion of this magnitude on the disk side of the slider is clearly not acceptable. A model of this cratering or protrusion is shown in FIG. 1, where melting/reflowing and redeposition is depicted. The model is an analytical model of laser ablation of any material that absorbs laser radiation. In FIG. 1 the dashed line depicts the Gaussian profile of the intensity of a laser spot from a single laser pulse, and the solid line depicts a cross-section of the resulting surface profile after the pulsed laser spot has been scanned along a line. The profile depicts a generally V-shaped cut or trench along the scan line with a lip or protrusion of material at the edges where the walls of the trench meet the substrate surface. Thus FIG. 1 shows that a laser slicing process based on a straightforward scanning of laser pulses along a line will invariably result in a lip or protrusion of material at the two edges of the cut, so such a process is clearly not applicable to slider manufacturing where the edge specifications are quite rigorous (i.e., tens of nanometers).

Figure 2:
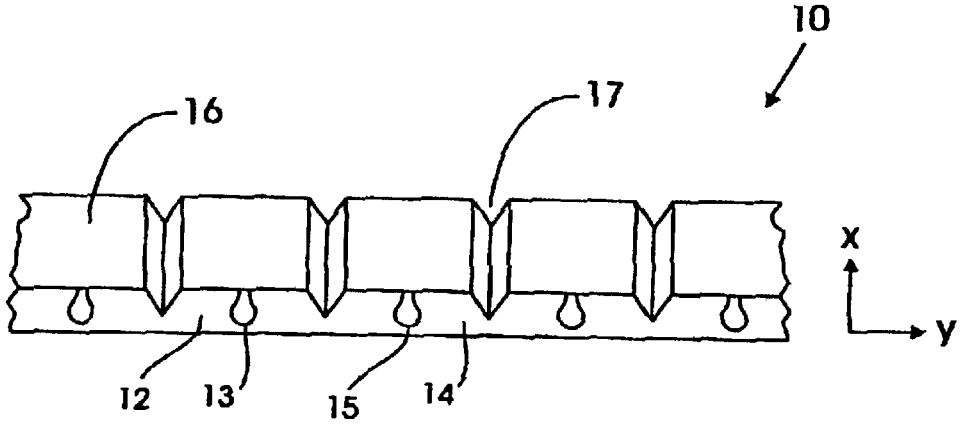
FIG. 2 is a schematic of a wafer row showing sliders that have been partially cut by a pulsed laser using the method of the present invention.
Figure 3:
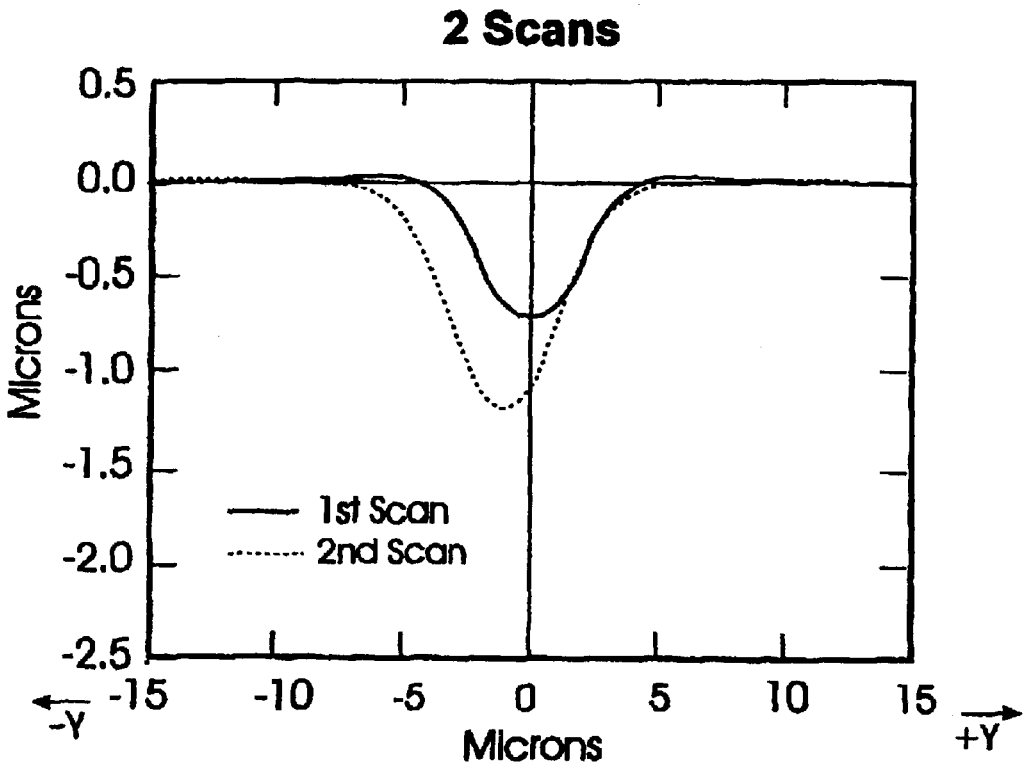
FIG. 3 shows the theoretical cross-section of the wafer surface profile (solid line) after the pulsed laser spot has been scanned along a first line and the wafer surface profile (dashed line) after the pulsed laser spot has been scanned along a second line laterally offset from the first line a distance equal to 20% of the laser beam diameter.
Figure 4:
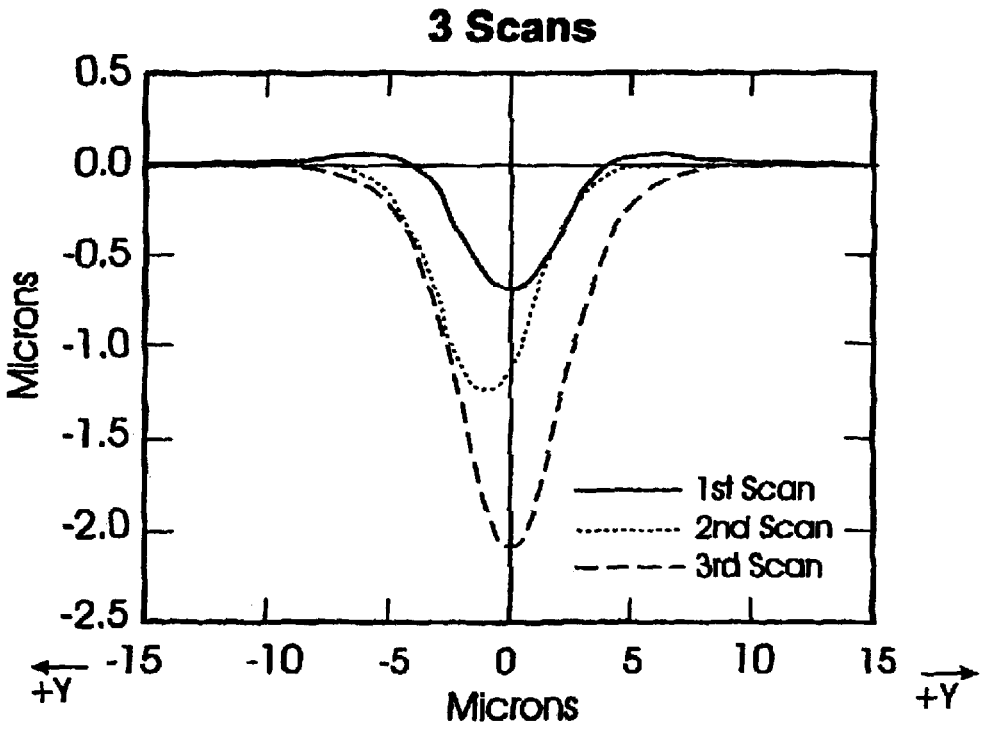
FIG. 4 shows the theoretical cross-section of the wafer surface profile after a single pulsed laser scan (solid line), after a second scan offset 20% of the laser beam diameter toward one edge (dotted line), and after a third scan offset 20% of the laser beam diameter toward the other edge (dashed line).

FIG. 2 is a schematic of a wafer row 10 showing sliders, such as typical uncut sliders 12, 14 having respective read/write heads 13, 15 patterned on their trailing surfaces, that have been partially cut along a V-shaped trench 17 by a pulsed laser using the method of the present invention. In the present invention the problem of cratering is solved by using multiple parallel pulsed laser scans, but with successive scans being offset from the first scan line by a distance less than the diameter of the laser beam (or laser spot on the wafer surface). The laser beam is directed generally perpendicular to the surface 16 of the wafer row 10. When a second scan is repeated but offset in the lateral direction (e.g., by approximately 10% of the laser spot diameter) then the edge of the cut on the side toward the displacement will exhibit less protrusion. Several factors contribute to this improved result. The second laser scan will ablate the existing protrusion, and the subsequent protrusion will be smaller due to the reduction in the amount of material that is ablated by the second scan. Thus a sequence of scan lines which are consecutively offset by a fraction of the laser beam diameter will produce a final edge that has no protrusion or lip. In addition, the sharpness of this final edge is adjustable by changing the amount of offset between subsequent scans. FIG. 3 shows results of the theoretical model used for FIG. 1 with a second laser pulse which is offset by 20% of the laser beam diameter. The dashed line shows a cross-section of the wafer surface profile after one scan, and the solid line shows the final surface profile after the second scan. Similarly, a cut with two desirable rounded or blended edges is produced by subsequent scan lines that are offset in both lateral directions. FIG. 4 shows the theoretical model cross-section of a cut after a single scan (solid line), after a second scan offset 20% of the laser beam diameter toward one edge (dotted line), and after a third scan offset 20% of the laser beam diameter toward the other edge (dashed line).

Figure 5:
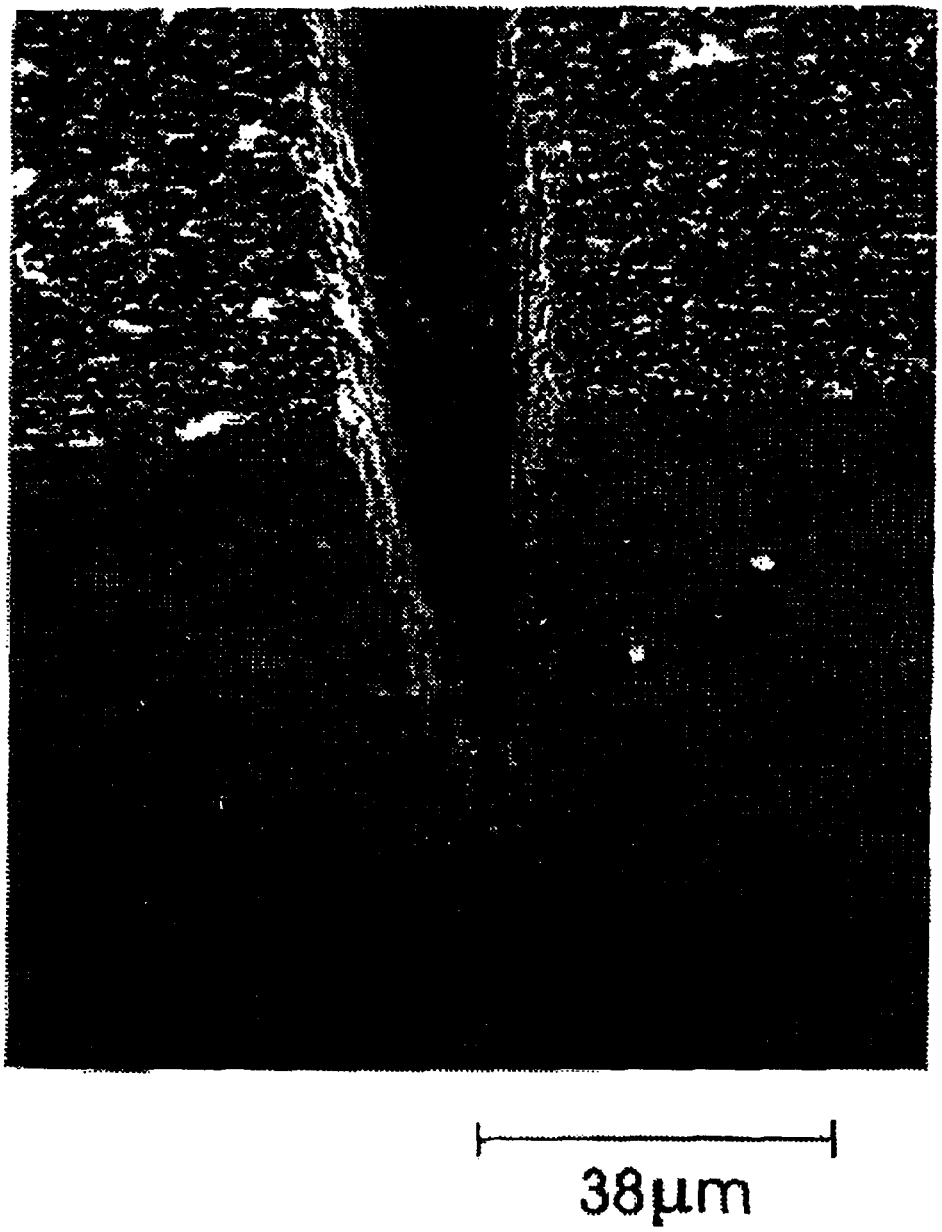
FIG. 5 is a scanning electron microscope (SEM) image of a cut made in a ceramic wafer using three pulsed laser scans according to the method of the present invention.

To test the theoretical model, ceramic slider wafers were partially cut using the process of multiple parallel pulsed laser scans, with the subsequent scans being offset from the first scan line by less than the laser beam diameter. A laser pulse of sufficient power (e.g., greater than 10 microjoules for a 355 nm pulse of 30 nanosecond duration focused to a spot size of 12 micron diameter, or 18 $J/cm^2$) will ablate the $TiC/Al_2O_3$ ceramic material. The laser beam is directed substantially perpendicular to the wafer surface so that a laser spot is formed on the wafer surface. As the laser spot is scanned along a line the laser is pulsed and the generally overlapping sequence of these laser pulses will cut a groove or trench into the wafer row. FIG. 5 is a scanning electron microscope (SEM) image of a partial cut made in a ceramic wafer using three scans, i.e., a first scan followed by a second scan offset by 2 microns in one direction, and a third scan offset by 2 microns in the other direction. The final edges where the walls of the trench meet the wafer surface appear desirably rounded without observable protrusions.

In practice, slider edges of the highest quality were produced using a sequence of repeated parallel scans, offset in both lateral directions. A typical process for partial cutting of the sliders in a wafer row uses a laser beam of 10 microns in diameter with insufficient fluence (laser pulse energy per unit surface area) to slice completely through the material. This laser beam is pulsed and moved across the surface to generate a first scan along a line defined as the X axis (Y=0), a second scan along the line defined by Y=+2 microns, a third scan along the line defined by Y=−2 microns, a fourth scan along the line defined by Y=+4 microns, and finally a fifth scan along the line defined by Y=−4 microns. In this way, laser ablation is used for partial cutting of the sliders with no protrusions or lips at the edges, as well as controllable roundness and radius of curvature at the edges. The radius of curvature at the edges is controlled by the depth of each cut (i.e., laser pulse energy, pulse overlap, and pulse width during a single scan), by the lateral offset between scans and by the number of offset scans. A larger offset will cause a larger radius of curvature.

If it is desired to cut deeper or to cut completely through the wafer row to separate the sliders from the row, then after the first scan and the one or more offset scans that round the edges, the laser is moved back to the Y=0 line and additional scans are performed. The subsequent Y=0 scans can be repeated until the sliders are completely separated, if desired. These subsequent scans will not affect the surface profile of either edge because the edges are now offset in the Y direction beyond the extent of the laser profile.

In the preferred embodiment of the present method, a ceramic wafer row is partially cut or scribed to define the individual sliders, as shown by FIG. 2. The laser parameters are chosen to simultaneously produce blended or rounded edges at the disk sides of the resulting sliders, and to produce narrow and sharply pointed trenches into the wafer row at the locations of the partial cuts. The depth of the trenches can be shallow (several microns of the 600 micron thickness of the wafer row) or deep (up to 450 microns of the 600 micron thickness). The shallow trenches are chosen to minimize the risk of accidental parting, cleaving, or fracture before the planned final cleaving step. The deeper trenches are chosen to minimize the force needed for the final cleaving step and to maximize the uniformity of the resulting sides of the sliders. The purpose of the partial cuts is to enable subsequent cleaving or breaking of the sliders from the wafer row at the trenches by exerting light pressure along the sides of the trenches. This cleaving is analogous to the method of cutting glass whereby a sheet of glass is scribed along a line and subsequently the glass is cleaved such that it fractures along this same line. Thus the fracture location is precisely controlled by the placement of the trenches or scribe lines.

The method of the present invention can also be used to make complete cuts in the wafer row and thus eliminate the need for the subsequent cleaving step. In addition, the advantages of the laser ablation method for partially cutting or completely cutting the wafer rows into sliders can also be applied earlier in the manufacturing process, namely to the slicing of the wafers into quads and the quads into wafer rows.

The present invention has allowed a substantial reduction in the kerf real estate, thereby increasing the number of sliders that can be formed from a wafer. While the conventional sawing process allowed 44 "pico" (1 mm wide) sliders to be produced from a single wafer row, the method of the present invention has allowed 47 pico sliders to be produced. The gain in the number of sliders that can be cut from a row would be greater for even smaller slider formats.

The method of the present invention can be performed on the wafer rows either before or after the row-level lapping or polishing process. Performing the laser scribing process before lapping allows the rows to be more flexible and thus reduces the bowing of the rows when they are placed in the lapping tool, thereby increasing the uniformity of the lapping process.

In addition to the reduction in kerf real estate, the manufacturing advantages of the present invention also include a) the production of sliders with desired rounded edges at their disk sides without the need for a separate edge blending step, b) the elimination of physical damage to the sliders and their read/write heads caused by the sawing process, and c) an elimination of static charge buildup caused by the sawing process.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for scribing lines in a ceramic wafer having a substantially planar surface, the wafer being a row of uncut magnetic recording head sliders for use in a magnetic recording disk drive and the planar wafer surface being the disk side of the sliders, the method comprising:

directing a laser beam to the wafer surface to form a spot on the wafer surface;

pulsing the laser beam while moving the laser spot along a first line on the wafer surface to form a cut in the wafer surface;

moving the laser spot on the wafer surface to be offset to one side of the first line by a distance less than the laser spot diameter; and pulsing the laser beam while moving the laser spot along a second line on the wafer surface substantially parallel to the first line.

2. The method of claim 1 further comprising, after moving the laser spot along the second line, moving the laser spot on the wafer surface to be offset to the other side of the first line by a distance less than the laser spot diameter, and pulsing the laser beam while moving the laser spot along a third line on the wafer surface substantially parallel to the first line.

3. The method of claim 2 further comprising, after moving the laser spot along the third line, moving the laser spot on the wafer surface back to the first line and pulsing the laser beam while moving the laser spot along the first line to make a deeper cut in the wafer at the first line.

4. The method of claim 3 wherein said deeper cut is sufficient to cut completely through the wafer.

5. A method for separating magnetic recording disk drive sliders from a ceramic wafer row of uncut sliders, the row having a planar surface to serve as the disk sides of the sliders when the sliders are completely cut from the wafer row, the method comprising:

directing a laser beam substantially perpendicular to the planar surface of the wafer row to form a spot;

scanning the laser spot along a first line on the planar surface while pulsing the laser to ablate ceramic material from the wafer row to form a generally V-shaped trench in the wafer row and thereby partially separate the sliders, the walls of the V-shaped trench and the planar surface intersecting at two edges;

moving the laser spot to be offset to one side of the first line by a distance less than the laser spot diameter;

scanning the laser spot along a second line substantially parallel to the first line while pulsing the laser to ablate ceramic material from a first edge of the V-shaped trench at the planar surface to thereby round said first edge;

moving the laser spot to be offset to the other side of the first line by a distance less than the laser spot diameter; and scanning the laser spot along a third line substantially parallel to the first line while pulsing the laser to ablate ceramic material from the other edge of the V-shaped trench at the planar surface to thereby round said other edge, whereby the sliders will have rounded edges on their disk sides when completely cut from the wafer row.

6. The method of claim 5 further comprising, after the scan along the third line, moving the laser back to the first line and performing at least one subsequent scan along the first line to cut deeper into the V-shaped trench.

7. The method of claim 6 wherein said deeper cut is sufficient to cut completely through the wafer and thereby completely separate the sliders.

* * * * *